(12) United States Patent
Tenuta

(10) Patent No.: US 9,785,291 B2
(45) Date of Patent: Oct. 10, 2017

(54) BEZEL SENSITIVE TOUCH SCREEN SYSTEM

(71) Applicant: Google Inc., Mountain View, CA (US)

(72) Inventor: Matthew Dominic Tenuta, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/891,169

(22) Filed: May 9, 2013

(65) Prior Publication Data

US 2014/0313156 A1    Oct. 23, 2014

Related U.S. Application Data

(60) Provisional application No. 61/712,738, filed on Oct. 11, 2012, provisional application No. 61/800,231, filed on Mar. 15, 2013.

(51) Int. Cl.
*G06F 3/044* (2006.01)
*G06F 3/0488* (2013.01)

(52) U.S. Cl.
CPC .......... *G06F 3/044* (2013.01); *G06F 3/04883* (2013.01); *Y10T 29/49105* (2015.01)

(58) Field of Classification Search
CPC .......... G06F 3/044; G06F 2203/04111; G06F 2203/04112; G06F 2203/04113; G06F 3/0414; G06F 3/047
USPC ...................... 345/173–179; 178/18.01–18.09
See application file for complete search history.

(56) References Cited

U.S. PATENT DOCUMENTS

| | | |
|---|---|---|
| 4,672,558 A | 6/1987 | Beckes et al. |
| 6,292,178 B1 | 9/2001 | Bernstein et al. |
| 6,755,491 B2 | 6/2004 | McElheney |
| 6,947,032 B2 | 9/2005 | Morrison |
| 6,972,401 B2 | 12/2005 | Akitt |
| 7,656,393 B2 | 2/2010 | King et al. |
| 8,674,959 B2 | 3/2014 | Corrion |
| 8,707,174 B2 | 4/2014 | Hinckley |
| 8,884,892 B2 | 11/2014 | Bakker |
| 9,310,994 B2 | 4/2016 | Hinckley et al. |
| 2003/0018457 A1 | 1/2003 | Bottino |

(Continued)

FOREIGN PATENT DOCUMENTS

| | | |
|---|---|---|
| KR | 1020120019268 A | 3/2012 |
| KR | 1020120042799 A | 5/2012 |

(Continued)

OTHER PUBLICATIONS

Search Report and Written Opinion for International Application No. PCT/US13/63911, dated Jan. 27, 2014, 13 pages.

(Continued)

*Primary Examiner* — Premal Patel
(74) *Attorney, Agent, or Firm* — Brake Hughes Bellermann LLP

(57) ABSTRACT

A touch screen and machine-implemented method for providing a touch screen panel are provided. The touch screen is formed on a panel including a display area and a bezel area that at least partially surrounds the display area. The touch screen includes a first pattern of conducting material arranged on the display area of the panel and a second pattern of conducting material arranged on the bezel area of the panel, where the first pattern of conducting material is transparent.

16 Claims, 5 Drawing Sheets

(56) References Cited

U.S. PATENT DOCUMENTS

| | | |
|---|---|---|
| 2004/0012572 A1* | 1/2004 | Sowden et al. ............... 345/173 |
| 2006/0097991 A1* | 5/2006 | Hotelling et al. ............ 345/173 |
| 2006/0238517 A1* | 10/2006 | King et al. .................... 345/173 |
| 2008/0041641 A1* | 2/2008 | Geaghan et al. .......... 178/18.05 |
| 2008/0252608 A1* | 10/2008 | Geaghan ....................... 345/173 |
| 2008/0284754 A1* | 11/2008 | Kao et al. ..................... 345/176 |
| 2009/0295753 A1 | 12/2009 | King |
| 2010/0175018 A1 | 7/2010 | Petschnigg |
| 2010/0245242 A1* | 9/2010 | Wu et al. ...................... 345/157 |
| 2011/0209093 A1 | 8/2011 | Hinckley |
| 2011/0264928 A1* | 10/2011 | Hinckley ...................... 713/300 |
| 2011/0310033 A1* | 12/2011 | Liu et al. ...................... 345/173 |
| 2011/0316807 A1* | 12/2011 | Corrion ................. G06F 3/0416 345/174 |
| 2012/0105345 A1* | 5/2012 | Lazaridis .............. G06F 3/0416 345/173 |
| 2012/0127115 A1 | 5/2012 | Gannon |
| 2012/0127118 A1 | 5/2012 | Nolting |
| 2012/0127130 A1* | 5/2012 | Jung ............................. 345/178 |
| 2012/0139852 A1 | 6/2012 | Huang |
| 2012/0170244 A1* | 7/2012 | Kwon ................... G06F 1/1637 361/829 |
| 2012/0304107 A1 | 11/2012 | Nan |
| 2015/0212639 A1 | 7/2015 | Wallace et al. |

FOREIGN PATENT DOCUMENTS

| | | |
|---|---|---|
| TW | 201224872 A | 6/2012 |
| WO | 2012037664 A1 | 3/2012 |
| WO | 2014058899 A1 | 4/2014 |

OTHER PUBLICATIONS

Extended European Search Report for EP Application No. 13845072.1, dated Apr. 25, 2016, 8 pages.

International Preliminary Report on Patentability for International Patent Application No. PCT/US2013/063911, dated Apr. 23, 2015, 9 pages.

Office Action for CN Application No. 201380052958.9, dated Feb. 22, 2017, 18 pages.

Torres, "Microsoft Surface Pro 4 rumored to have ridiculously thin bezels", retrieved on Oct. 18, 2016 from http://www.slashgear.com/microsoft-surface-pro-4-rumored-to-have-ridiculously-thin-bezels-02407569/, Oct. 2, 2015, 10 pages.

* cited by examiner

BEZEL SENSITIVE TOUCH SCREEN SYSTEM

RELATED APPLICATION

This application claims priority to U.S. provisional patent application 61/712,738, filed on Oct. 11, 2012, entitled "BEZEL SENSITIVE TOUCH SCREEN SYSTEM" and to U.S. provisional patent application 61/800,231, filed on Mar. 15, 2013, entitled "BEZEL SENSITIVE TOUCH SCREEN SYSTEM," the contents of which are herein incorporated by reference in their entireties.

BACKGROUND

The present disclosure generally relates to a touch screen, and, in particular, to a touch screen that includes an active display area and a non-display bezel area.

Touch screens may be integrated with modern computing devices to serve as input devices. A variety of different user interactions with the touch screen may produce different inputs. A selection of an item may be received as a user touching a user interface icon on the touch screen. Additionally, user commands may be received as gestures performed on the touch screen. For example, a horizontal finger swipe from left to right across a touch screen may correspond to a "navigate forward" command on a browser. User commands, whether received as discreet contacts or as gestures, are generally received on the active display area of the touch screen.

SUMMARY

The disclosed subject matter relates to a touch screen formed on a panel including an active display area and a bezel area that at least partially surrounds the display area. The touch screen includes a first pattern of conducting material arranged on the display area of the panel and a second pattern of conducting material arranged on the bezel area of the panel, where the first pattern of conducting material is transparent.

The disclosed subject matter also relates to a machine-readable medium including instructions stored therein, which when executed by a system, cause the system to perform operations including providing a first pattern of conducting material in a display area of the touch screen panel, where the first pattern of conducting material is transparent. At least a second pattern of conducting material is provided in the non-display bezel area of the touch screen panel, where the at least second pattern is different from the first pattern. A third pattern of conducting material is provided in a boundary area between the display area and the non-display bezel area of the touch screen panel.

According to various aspects of the subject technology, a system comprising a panel that includes a display area and a bezel area is provided. The system includes a first pattern of conducting material which is arranged on the display area of the panel, and a second pattern of transparent conducting material which is arranged on the bezel area of the panel, where the first pattern of conducting material is transparent, and the first and second patterns are different. The system also includes a controller for sensing changes in capacitances of the first pattern of conducting material and the second pattern of conducting material as a result of a user interaction with the touch screen panel. The controller is used to determine whether the user interaction is located in the display area of the panel or the bezel area of the panel.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
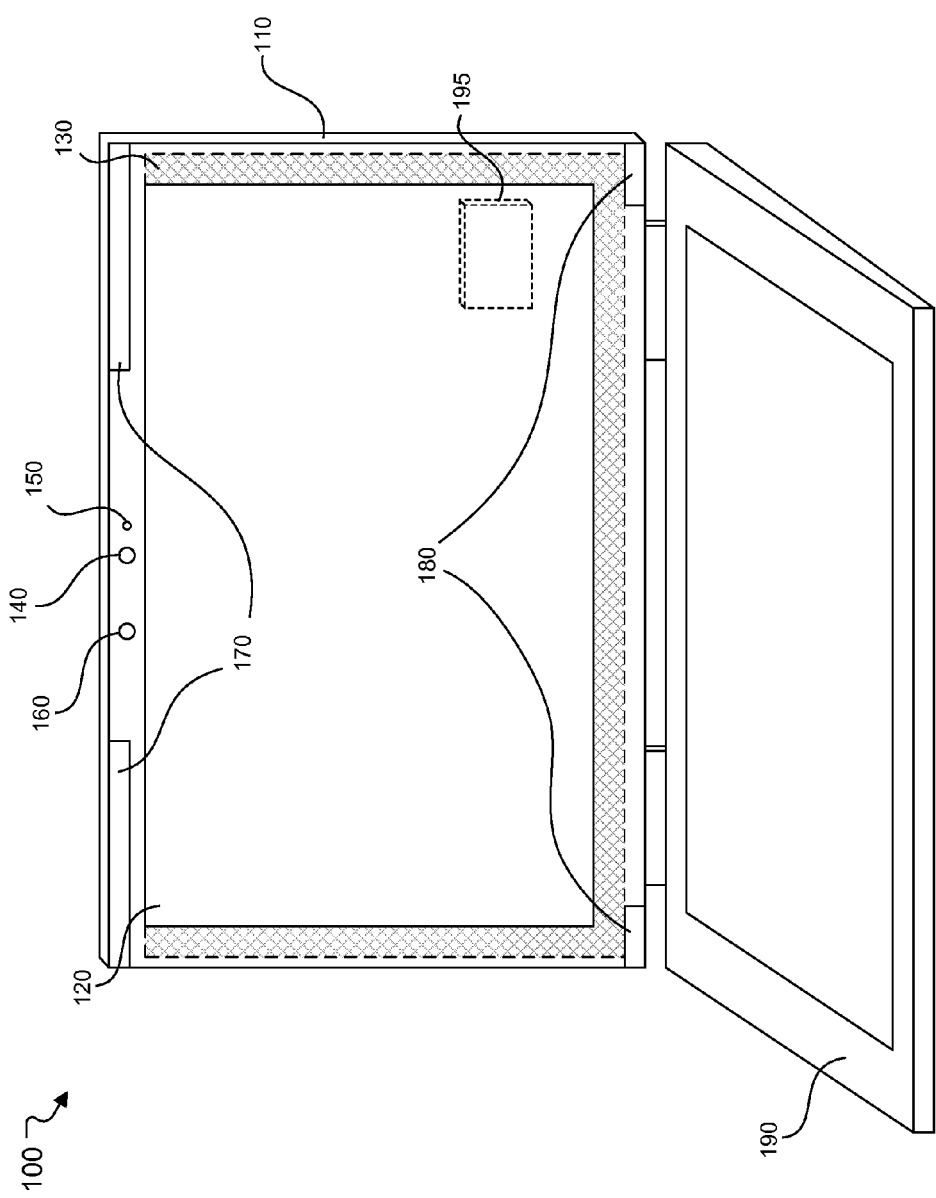
FIG. 1 illustrates an example of a system of a touch screen formed on a panel including an active display area and a bezel area, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The disclosed subject matter provides a touch screen for detecting the presence and location of a touch (e.g., from a finger, a stylus, etc.) on a panel. The panel of the touch screen includes an active display area and a bezel area. The inclusion of the bezel area allows certain functions to be performed on the touch screen without obscuring the content on the active display area of the panel. The bezel area may also provide for additional commands that can be input exclusively in the bezel area. For example, swiping a finger up and down the bezel area may cause a displayed page to scroll up and down. Furthermore, different commands may be input as a combination of touches on the active display area and the bezel area, a combination of touches in two different locations of the bezel area, or a gesture that crosses from the active display area into the bezel area or vice versa. For instance, a gesture that swipes down the left bezel area and across the bottom bezel area to the right may represent one navigation command. Similarly, a gesture that swipes down the right bezel area and across the bottom bezel area to the left may represent another navigation command. Additional gestures combinations corresponding to additional commands can also be incorporated.

Touch screens may be implemented using a lattice of conducting material, such as indium tin oxide (ITO), that is deposited as a thin film on a backside of a substrate (e.g., glass, plastic, etc.). An additional approach would be to apply a mesh of copper or silver conductive material to the backside of the substrate. An active display such as a liquid crystal display (LCD) may be laminated behind the substrate to form a liquid crystal module. The lattice of conducting material may be deposited to form touch screen areas that correspond to a bezel area and an active display area. For example, the lattice of conducting material may be deposited in the left and right bezel areas, the bottom bezel area, and the active display area. The inclusion of a touch screen in the bezel area allows certain functions to be performed on the touch screen without obscuring the content on the active display area. Furthermore, patterns of the lattice of conducting material may be varied between the touch screen areas that correspond to the bezel area and that correspond to the active display in order to facilitate the identification of user interactions on different areas of the touch screen (e.g., bezel area versus active display area), as described in further detail below.

FIG. 1 illustrates example system 100 that includes a touch screen, in accordance with various aspects of the subject technology. The touch screen is formed of a panel that includes active display area 120 and bezel area 130. In some aspects, system 100 includes upper housing 110 and lower housing 190 of a device. System 100 also includes controller 195 in upper housing 110 for sensing changes in capacitances in response to contact on the touch screen. Controller 195 provides coordinates of the contact at regular intervals to a processor for processing. The device may include a portable computing device, such as a laptop, a netbook, or a mobile phone. Alternatively, system 100 may include only upper housing 110 (e.g., a tablet device), where all computing components and input components are included in upper housing 110.

Figure 2:
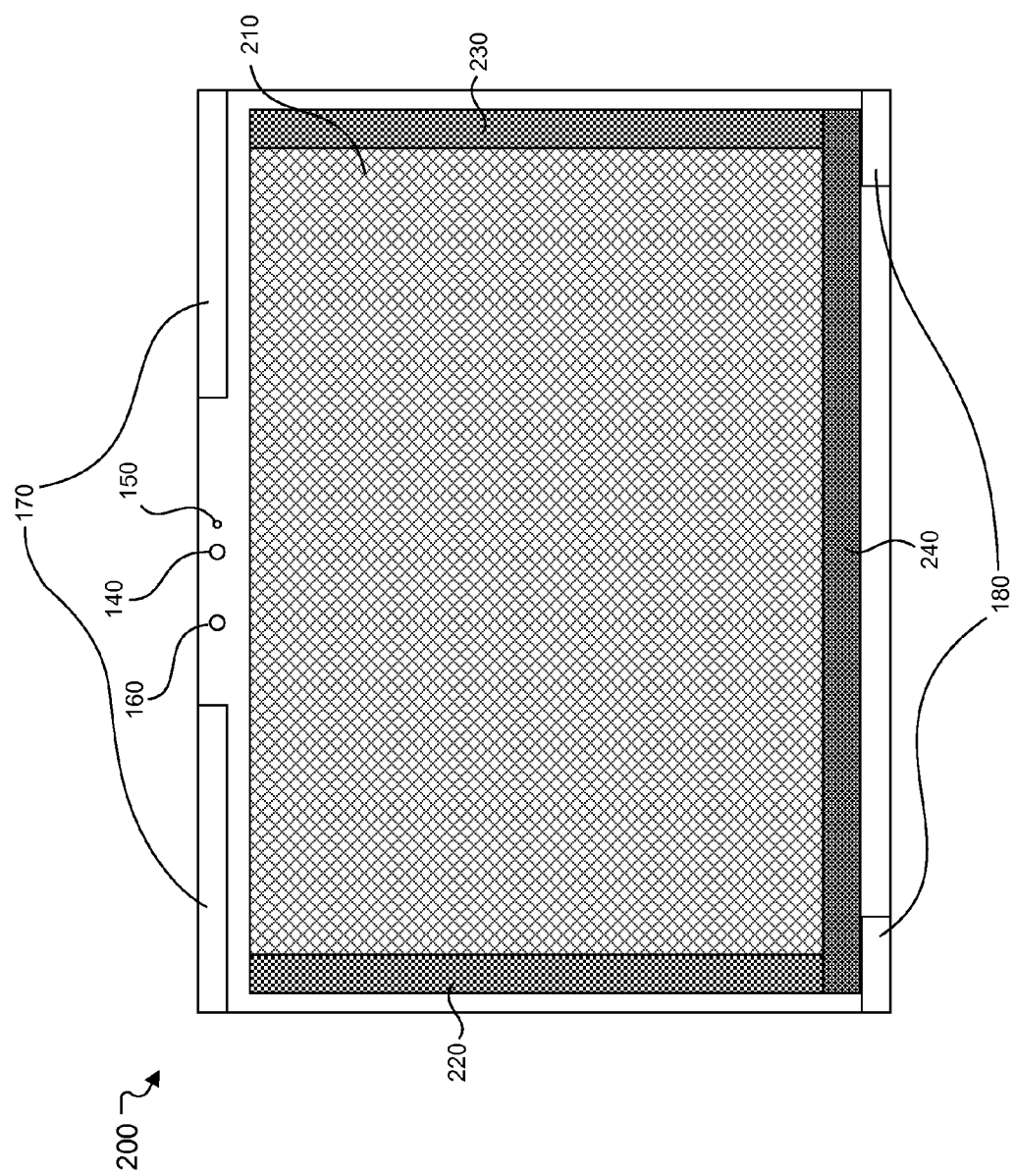
FIG. 2 provides a graphical representation of different sections of a touch screen, in accordance with various aspects of the subject technology.

FIG. 2 provides a graphical representation of different sections of the panel of the touch screen, in accordance with various aspects of the subject technology. First touch panel area 210 represents a lattice pattern of conducting material disposed on an area of the panel that corresponds to active display area 120. Since first touch panel area 210 corresponds to active display area 120, a lattice of transparent conducting material may be used so that illuminated pixels are not obscured. Second touch panel area 220 represents a lattice pattern of conducting material disposed on an area of the panel that corresponds to a left portion of bezel area 130, and third touch panel area 230 represents a lattice pattern of conducting material disposed on an area of the panel that corresponds to a right portion of bezel area 130. Furthermore, fourth touch panel area 240 represents a lattice pattern of conducting material disposed on an area of the panel that corresponds to a bottom portion of bezel area 130. In other aspects, although not shown in FIG. 2, the panel may also include another touch panel area that represents a lattice pattern of conducting material disposed on an area of the panel that corresponds to a top portion of the bezel area. Bezel area 130 of the panel on which the second, third and fourth touch panels areas 220, 230, and 240 are disposed may be opaque in order to provide a frame around active display area 120. The opacity of bezel area 130 may be formed by applying a black mask on an optically clear touch panel, thereby distinguishing the bezel area from the active display area from the user's perspective.

In some aspects, the lattice pattern of conducting material of second touch panel area 220, third touch panel area 230, and fourth touch panel area 240 are different from the lattice pattern of conducting material of first touch panel area 210. For example, the geometry of the lattice pattern may be altered (e.g., varying the pitch of the lattice pattern, using different shapes for the lattice pattern, etc.) to distinguish second, third and fourth touch panels areas 220, 230, and 240, from first touch panel area 210, such that user interactions with the touch screen may be differentiated as being on the display area, on the bezel area, or transitioning from one area to the other. As shown in FIG. 2, each of second touch panel area 220, third touch panel area 230, and fourth touch panel area 240 are located adjacent to first touch panel area 210. Furthermore, second touch panel area 220 and third touch panel area 230 each share a side with fourth touch panel area 240. While each of the touch panel areas may include a different geometry of the lattice pattern, the panel on which the lattice patterns are disposed is a single continuous panel. Thus, from the perspective of a user, a single touch screen including the active display area and the bezel area on which user interactions are performed is presented. Furthermore, one or more separate sensors may be bounded to the masked area. For example one or more sensors made of flexible circuits may be laminated on the backside of the bezel area. Flexible circuits may include, for example, a flexible printed circuit (FPC) or flexible foil circuit (FFC).

In some implementations, upper housing 110 may include devices such as camera module 140, indicator light 150, and ambient light sensor 160. Additionally, upper housing 110 may include devices such as cellular antennas 170 and wi-fi antennas 180. The lattice patterns of conducting material may be disposed on the panel so as not to not overlap with cellular antennas 170 and wi-fi antennas 180 in order to minimize interference with the antennas that may be caused by the conducting material. Thus, if the panel extends to the top, bottom, and side edges of upper housing 110 that includes cellular antennas 170 and/or wi-fi antennas 180, the lattice patterns of conducting material and corresponding interconnects (e.g., wires that connect the touch screen to the controller) may be disposed on an area of the panel that does not coincide with the location of cellular antennas 170 and/or wi-fi antennas 180. However, if the panel does not extend to the edges of upper housing 110, and does not overlap with cellular antennas 170 and/or wi-fi antennas 180, then the lattice patterns of conducting material may be disposed on the entire panel. Furthermore, since transparent conducting material does not obscure the passage of light, a lattice pattern of transparent conducting material may be disposed over the area of the upper portion of the display panel 110 on which camera module 140, indicator light 150 and ambient light sensor 160 are located.

Figure 3:
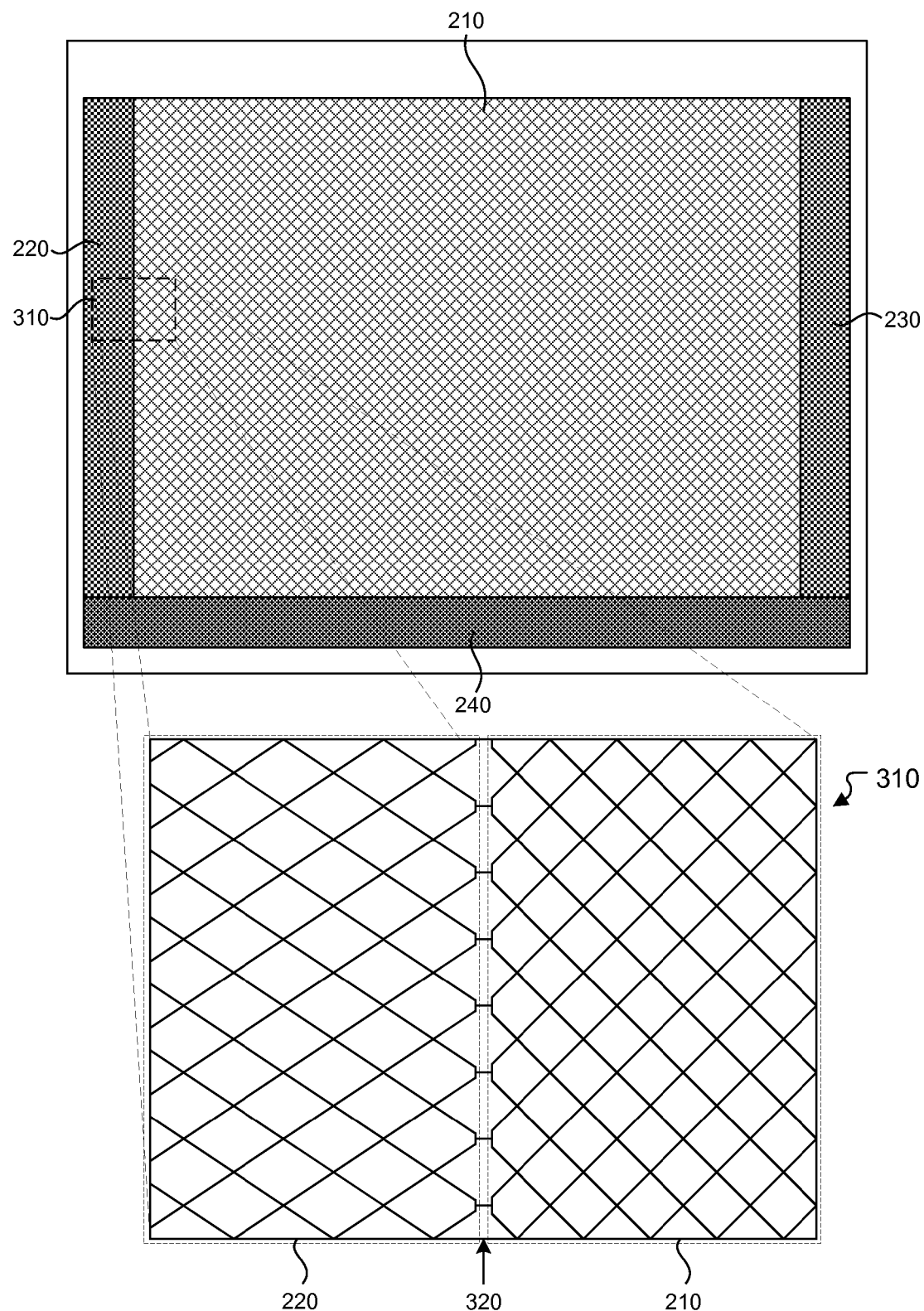
FIG. 3 provides a graphical representation of a transition area between different sections of a touch screen, in accordance with various aspects of the subject technology.

FIG. 3 provides a graphical representation of a transition area between different sections of the panel of the touch screen, in accordance with various aspects of the subject technology. In some implementations, a gap between each of second, third and fourth touch panel areas 220, 230, and 240, and first touch panel area 210 may be provided in order to distinguish between the two areas. Transition area 310 provides an example of a transition between second touch panel area 220 and first touch panel area 210. As shown in the enlarged diagram, gap 320 is provided between second touch panel area 220 and first touch panel area 210. Gap 320 includes a fifth touch panel area that separates the lattice patterns of second touch panel area 220 and first touch panel area 210. Separating the lattice patterns with a gap creates a small insensitive area in between two different touch panel areas. In some aspects, gap 320 is formed as an area where no receive side of the lattice pattern is present, as described in further details below. The insensitive area between two different touch panel areas may facilitate the determination of when a touch input being made in one area transitions to a touch input being made in the other area.

In some implementations, a touch screen that extends beyond active display area 120 and into bezel area 130 of display 110 is provided. Gap 320 is formed to distinguish between first touch panel area 210 corresponding to display area 120 and second, third, and fourth touch panel areas 220, 230, and 240, corresponding to a bezel around the display area. By extending the touch panel into the bezel area and distinguishing the separate touch panel areas from one another with gap 320, a transition from a command in the bezel area to a command in the display area (e.g., a finger swipe from the bezel area into the active display area of the touch screen) may be identified.

By distinguishing different sections of the panel of the touch screen, different commands may be implemented as user interactions exclusively in the display area or bezel area, a combination of user interaction on the display area and the bezel area, a combination of user interaction in two different locations of the bezel area, or a user interaction that crosses from the display area into the bezel area or vice versa. For example, a user interaction that swipes down the left bezel area and across the bottom bezel area to the right may represent one navigation command. Similarly, a user interaction that swipes down the right bezel area and across the bottom bezel area to the left may represent another navigation command. Additional user interactions corresponding to additional commands may also be incorporated. The additional user interactions may be predefined or programmed through a set of user preference settings. For example, different user interactions may be programmed to represent different commands. Numerous commands may be programmed for different user interactions corresponding to the commands.

Figure 4A:
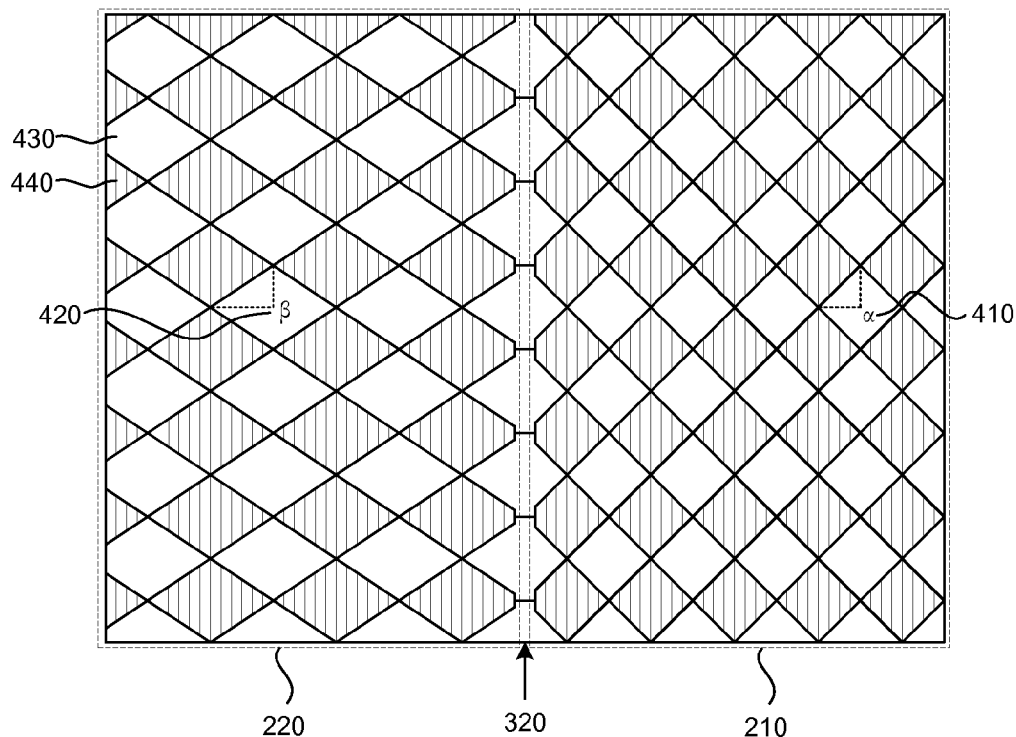
FIGS. 4a and 4b provide schematic diagrams of two adjacent sections of a touch screen, in accordance with various aspects of the subject technology.
Figure 4B:
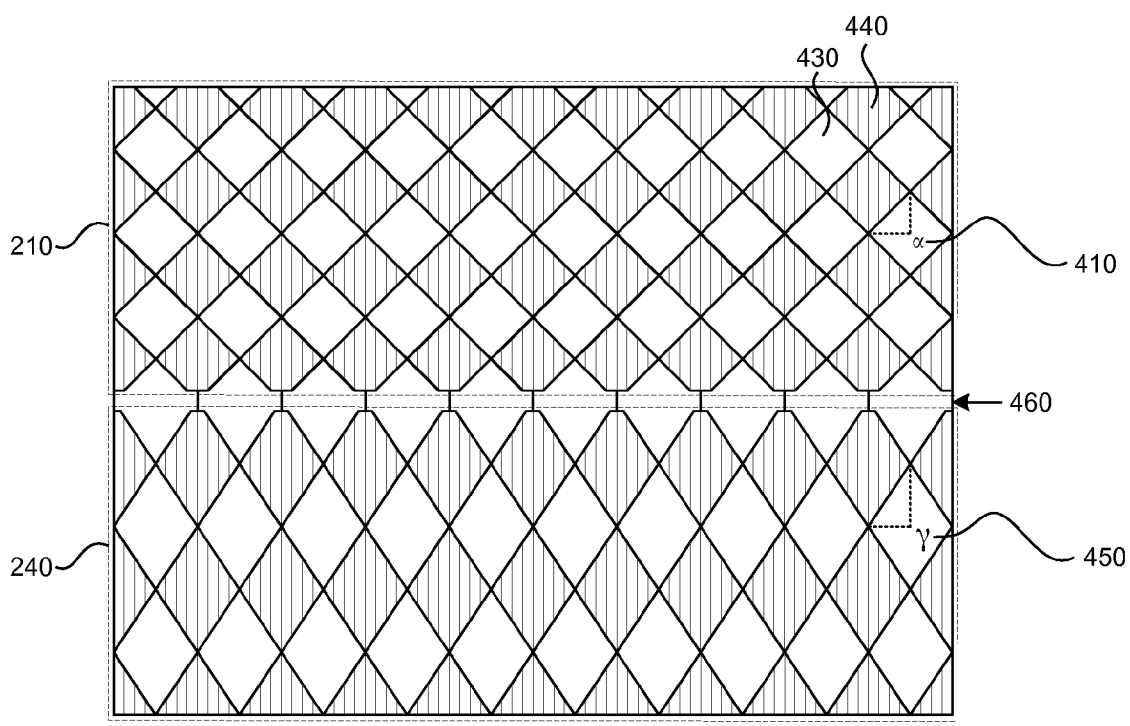

FIGS. 4a and 4b provide schematic diagrams of two adjacent sections of a touch screen, in accordance with various aspects of the subject technology. FIG. 4a provides an example of a transition area between second touch panel area 220 and first touch panel area 210. Each of first touch panel area 210 and second touch panel area 220 includes transmit side 430 and receive side 440, wherein a location of a user input is determined based on a change in capacitance between transmit side 430 and receive side 440 of the touch panel area. Gap 320 is formed between second touch panel area 220 and first touch panel area 210 to distinguish between the two areas.

As shown in FIG. 4a, gap 320 is formed as an area where receive side 440 is not present. A gap of width x (e.g., 1 mm<x<2 mm) may be formed by extending transmit side 430 to form the gap, thus creating a small insensitive area in between the lattice patterns of conducting material of the two different touch panel areas. The insensitive area created by gap 320 may facilitate the determination of when a touch input being made in one area transitions to a touch input being made in the other area. In some aspects, gap 320 is formed as a fifth touch panel area that separates second touch panel area 220 and first touch panel area 210. Furthermore, while the illustrations provided in FIGS. 4a and 4b depict gap 320 being formed by extending transmit side 430, gap 320 may alternatively be formed by extending receive side 440 such that a small insensitive area is created where transmit side 430 is not present.

FIG. 4a further provides an illustration of the different geometries of lattice patterns of conducting material used in second touch panel area 220 and first touch panel area 210. While the figures depict the utilization of diamond-shaped lattice patterns, other geometric shapes (e.g., triangles, squares, rectangles, circles, etc.) may also be used to form the lattice patterns. First touch panel area 210, as shown in the figure, has a first geometry of the lattice corresponding to a first pitch 410 of $\alpha$. Second touch panel area 220, on the other hand, has a second geometry of the lattice pattern corresponding to a second pitch 420 of $\beta$. In this example, first pitch 410 is shown to be greater than second pitch 410. The varying pitch between second touch panel area 220 and first touch panel area 210 corresponds to different geometries of the lattice pattern. The different geometries of lattice patterns causes a continuous user interaction from the second touch panel area 220 to first touch panel area 210 (or vice versa) to register as a discontinuous movement.

Since the geometry of the lattice pattern in first touch panel area 210 has a smaller pitch than the geometry of the lattice pattern of second touch panel area 220, a continuous user interaction from second touch panel area 220 to first touch panel area 210 will register as a slower velocity when the user interaction is on second touch panel area 220, and snap (i.e., instantly accelerate) to a higher velocity when the user interaction transitions into first touch panel area 210. The slower velocity movement snapping to a higher velocity movement may then be identified as a transition from a bezel touch panel area to a display touch panel area. A similar utilization of different geometries and different pitches in the lattice patterns of conducting material may further be used to distinguish third touch panel area 230 and first touch panel area 210.

FIG. 4b also provides an illustration of the different geometries in the lattice patterns of conducting material. As shown in the figure, fourth touch panel area 240 includes a third geometry of the lattice pattern corresponding to a third pitch 450 of $\gamma$, which is different from the first geometry of the lattice pattern corresponding to a first pitch 410 of $\alpha$. In this example, first pitch 410 is shown to be smaller than third pitch 450. Similar to FIG. 4a, varying the geometries in the lattice patterns between the fourth touch panel area 240 and first touch panel area 210 causes a continuous user interaction from fourth touch panel area 240 to first touch panel area 210 (or vice versa) to register as a discontinuous movement. Since the geometry of the lattice pattern in first touch panel area 210 corresponds to a lower pitch than the geometry of the lattice pattern of fourth touch panel area 240, a continuous user interaction from fourth touch panel area 240 to first touch panel area 210 will register as a slower velocity when the user interaction is on fourth touch panel area 220, and snap to a higher velocity when the user interaction transitions into first touch panel area 210. The slower velocity movement snapping to a higher velocity movement, in this example, may also be identified as a transition from a bezel touch panel area to a display touch panel area.

In some aspects, gap 460 may also be formed as a fifth touch panel area that provides a small insensitive area in between bottom bezel touch panel area 240 and display touch panel area 210. The insensitive area between the two different touch panel areas, formed as an area where receive side 440 is not present, may also be used to facilitate the determination of when a touch input being made in one area transitions to a touch input being made in the other area.

In some implementations, varying geometries between the bezel touch panel areas and the display touch panel area may facilitate differentiation in the area of the user interaction. For example, the pitch in second touch panel area 220 causes the diamond shapes formed by the lattice pattern of the second touch panel area 220 to have larger geometric areas than that of the diamond shapes formed by the lattice pattern of the first touch panel area 210. Thus, a same user interaction (e.g., a fingertip touch) in each of the two touch panel areas will effectively register as different sizes. For example, since the lattice pattern of first touch panel area 210 is more tightly knit, a fingertip touch on that lattice pattern will register as covering more area than that of a similar fingertip touch of the latter pattern on the second touch panel area 220, which is not as tightly knit (e.g., more stretched out in pitch). This variance in the size of user interactions may provide an indication as to whether the user interaction is occurring in the bezel area or in the display area.

Figure 5:
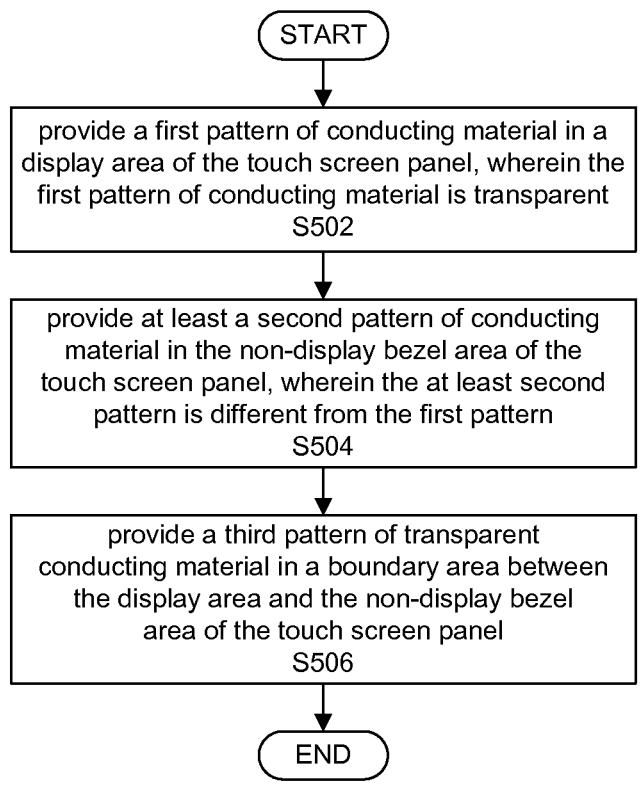
FIG. 5 illustrates an example of a method for providing a touch screen on a panel that includes an active display area and a bezel area, in accordance with various aspects of the subject technology.

FIG. 5 illustrates an example of a method for providing a touch screen on a panel that includes a display area and a bezel area, in accordance with various aspects of the subject technology. Method 500 includes providing a first pattern of conducting material in a display area of a touch screen panel, where the first pattern of conducting material is transparent. The method also includes providing at least a second pattern of conducting material in the non-display bezel area of the touch screen panel, where the at least second pattern is different from the first pattern. The method further includes providing a third pattern of conducting material in a boundary area between the display area and the non-display bezel area of the touch screen panel.

In some implementations, the first and second patterns of conducting material form diamond shapes; however, other geometric shapes may also be used to form the lattice patterns. The first and second patterns may also have varying geometries (e.g., different pitches in the lattice patterns). As described in reference to FIGS. 4a and 4b, the varying geometries between the bezel touch panel area and the display touch panel area causes a continuous user interaction from one of the touch panel areas to the other to register as a discontinuous movement. The third pattern of conducting material is provided in a boundary area between the display area and the bezel area of the touch screen panel and forms an insensitive area that separates the first pattern of conducting material from the at least second pattern of conducting material. The insensitive area between two different touch panel areas may facilitate the determination of when a touch input being made in one area transitions to a touch input being made in the other area. In some aspects, additional patterns may be provided to further differentiate different sections of a touch screen. For example, a fourth and a fifth pattern of conducting material may also be formed on the bezel area of the touch screen panel to represent other sections of the bezel for which a touch screen panel is provided. The pitches of the fourth and fifth patterns may be different from that of the first and the second patterns.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "upper," "bottom," "lower," "right," "left," "up," "down," "forward," "backward," and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology.

What is claimed is:

1. A touch screen comprising:
a panel comprising a display area, a non-display bezel area having a left bezel area, a right bezel area, a top bezel area, and a bottom bezel area, and a gap area between the display area and the non-display bezel area of the panel, the non-display bezel area at least partially surrounding the display area, and wherein the gap area has a non-infinitesimal width;
a first pattern of conducting material arranged on the display area of the panel, the first pattern of conducting material being transparent and being formed as a geometric shaped lattice with a first pitch; and
a second pattern of conducting material arranged on the bottom bezel area of the panel and being formed as a diamond shaped lattice with a second pitch;
a third pattern of conducting material arranged on the left bezel area and being formed as a diamond shaped lattice with a third pitch;
and a fourth pattern of conducting material arranged on the right bezel area and being formed as a diamond shaped lattice with a fourth pitch,
wherein the gap area includes a fifth pattern of conducting material and forms an insensitive area that separates the first pattern of conducting material from at least the second pattern of conducting material,
and wherein the first pitch is different from the second, third and fourth pitches.

2. The touch screen of claim 1, wherein the second pitch is different from the third and fourth pitches.

3. The touch screen of claim 2, wherein the third and fourth pitches are different from one another.

4. The touch screen of claim 1, further comprising a controller for sensing changes in capacitances of the first pattern of conducting material and the second pattern of conducting material as a result of a user interaction with the panel, and for determining whether the user interaction is located in the display area of the panel or the bezel area of the panel.

5. The touch screen of claim 1, wherein the gap area has a width of greater than 1 mm.

6. A method for providing a touch screen panel, the method comprising:
providing a first pattern of conducting material as a geometric shaped lattice with a first pitch in a display area of the touch screen panel, the first pattern of conducting material being transparent;
providing a second pattern of conducting material as a geometric shaped lattice with a second pitch in a non-display bezel area of the touch screen panel, wherein the second pattern is different from the first pattern; and
providing a third pattern of conducting material in a gap area between the display area and the non-display bezel area of the touch screen panel, wherein the gap area has a non-infinitesimal width;
providing a fourth pattern of conducting material as a geometric shaped lattice with a fourth pitch in the non-display bezel area of the touch screen panel; and
providing a fifth pattern is provided as a geometric shaped lattice with a fifth pitch in the non-display bezel area of the touch screen panel, and wherein the first pitch is different from the second, fourth, and fifth pitches,
wherein the gap area forms an insensitive area that separates the first pattern of conducting material from the second pattern of conducting material, and
wherein the first pitch is different from the second, fourth, and fifth pitches.

7. The method for providing the touch screen panel of claim 6, wherein providing the second pattern of conducting material in the non-display bezel area of the touch screen panel includes providing the second pattern of conducting material on a bottom bezel area of the touch screen panel, wherein providing the fourth pattern of conducting material includes providing the fourth pattern on a left bezel area of the touch screen panel, and wherein providing the fifth pattern of conducting material includes providing the fifth pattern on a right bezel area of the non-display bezel area of the touch screen panel.

8. The method for providing the touch screen panel of claim 6, wherein the second pitch is different from the third and fourth pitches.

9. The method for providing the touch screen panel of claim 6,
wherein providing the first pattern of conducting material in the display area of the touch screen panel and providing the second pattern of conducting material in the non-display bezel area of the touch screen panel comprises providing a transmitting conducting material and a reception conducting material, and
wherein providing the third pattern of conducting material in the gap area between the display area and the non-display bezel area of the touch screen panel comprises providing one of a transmitting conducting material or a reception conducting material in the gap area between the display area and the non-display bezel area of the touch screen panel to form the insensitive area that separates the first pattern of conducting material from the at least second pattern of conducting material.

10. The method for providing the touch screen panel of claim 9, further comprising providing a controller for sensing changes in capacitances of the first pattern of conducting material and the at least second pattern of conducting material as a result of a user interaction with the touch screen panel, the controller being used to determine whether the user interaction is located in the display area of the panel or the non-display bezel area of the touch screen panel.

11. The method of claim 6, wherein the second pitch is different from the fourth and fifth pitches.

12. The method of claim 6, wherein the fourth and fifth pitches are different from one another.

13. A system comprising:
a panel comprising a display area, a bezel area, and a gap area between the display area and the bezel area, wherein the gap area has a non-infinitesimal width;
a first pattern of conducting material arranged on the display area of the panel as a diamond shaped lattice with a first pitch, the first pattern of conducting material being transparent;
a second pattern of conducting material arranged on the bezel area of the panel as a diamond shaped lattice with a second pitch;
a third pattern of conducting material in the gap area between the display area and the bezel area of the panel, wherein the third pattern of conducting material forms an insensitive area that separates the first pattern of conducting material from the at least second pattern of conducting material;

a fourth pattern of conducting material arranged on the bezel area of the panel as a diamond shaped lattice with a fourth pitch;

a fifth pattern of conducting material arranged on the bezel area of the panel as a diamond shaped lattice with a fifth pitch wherein the first pitch is different from the second, fourth and fifth pitches; and a controller configured for sensing changes in capacitances of the first pattern of conducting material and configured for sensing changes in capacitances of the second pattern of conducting material as a result of a user interaction with the touch screen panel, the controller being further configured to determine whether the user interaction is located in the display area of the panel or in the bezel area of the panel.

14. The system of claim 13, wherein the second pattern of conducting material is arranged on a bottom bezel area of the panel, wherein the fourth pattern of conducting material is arranged on a left bezel area of the panel, and wherein the fifth pattern of conducting material is arranged on a right bezel area of the panel.

15. The system of claim 13, wherein the second pitch is different from the fourth and fifth pitches.

16. The system of claim 13, wherein the fourth and fifth pitches are different from one another.

* * * * *